Dec. 11, 1928.
A. R. ROGERS
1,694,724
SEPARATOR
Filed July 18, 1927
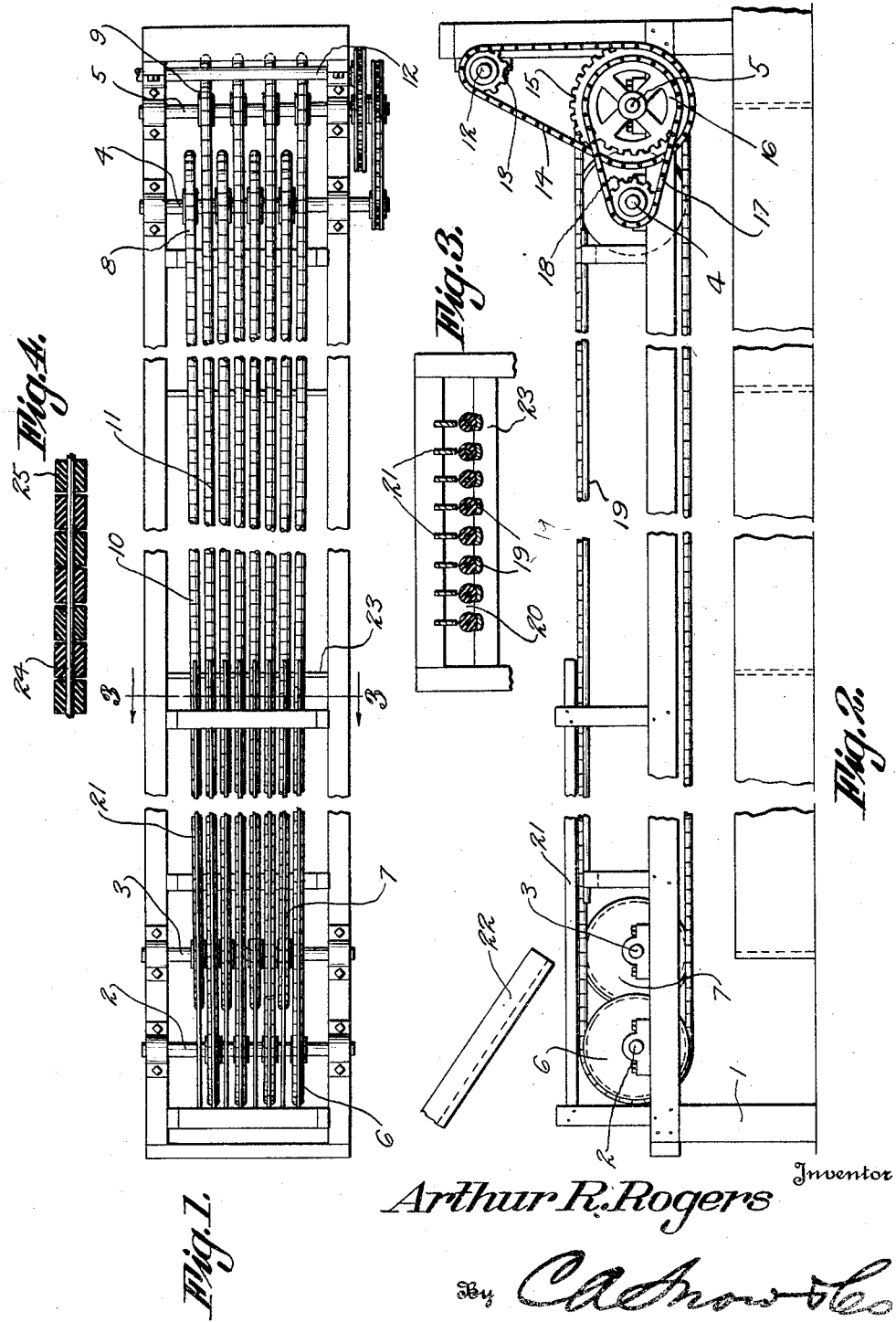
Arthur R. Rogers, Inventor Patented Dec. 11, 1928.

1,694,724

UNITED STATES PATENT OFFICE.

ARTHUR R. ROGERS, OF JONESPORT, MAINE.

SEPARATOR.

Application filed July 18, 1927. Serial No. 206,589.

This invention relates to separators designed primarily for separating or grading small fish such as sardines although it can be used to advantage in separating larger fish and also in separating materials other than fish.

One of the objects of the invention is to provide a simple and efficient machine of this type formed of comparatively few parts and which serves to accurately grade the materials without danger of tearing or otherwise mutilating them.

A further object is to provide a separator which can be operated readily and will not easily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a plan view of the machine, parts being broken away.

Figure 2 is a side elevation of the structure shown in Figure 1.

Figure 3 is a section through the upper portion of the machine, said section being taken on the line 3—3, Figure 1.

Figure 4 is an enlarged section through a portion of one of the belts of the separator.

Referring to the figures by characters of reference 1 designates a frame of any suitable proportions and material and journaled on this frame adjacent one end are parallel shafts 2 and 3 while another pair of parallel shafts 4 and 5 are journaled on the frame near the other end thereof. Mounted on the shaft 2 are grooved wheels 6 all of the same diameter, these wheels being spaced apart. Another series of grooved wheels 7 is carried by the shaft 3, these wheels being disposed in staggered relation to the wheels 6 so as to lap the same, the lapping portions of the wheels 6 and 7 being regularly spaced.

Secured to and rotatable with the shaft 4 is a series of grooved wheels 8 and another series of grooved wheels 9 rotates with the shaft 5. The wheels 9 and 8 are staggered, the wheels of the two series being disposed in lapped relation and all of the wheels having their lapping portions spaced apart equal distances. The wheels 8 and 9 are spaced apart greater distances than are the wheels 6 and 7. Mounted on each of the wheels 7 is an endless belt 10 extending longitudinally of the frame 1 and mounted on one of the grooved wheels 8. As the wheels 8 are spaced apart greater distances than the wheels 7, the several belts 10 will diverge toward the shaft 4. Additional endless belts 11 are mounted on the grooved wheels 9 and 6 and extend between the belts 10. As the wheels 9 are spaced apart greater distances than the wheels 6 these belts 11 will of course diverge toward the shaft 5. In fact all of the belts will diverge toward one end of the machine with the result that the spaces provided between the belts will gradually increase in width from one end to the other of the machine.

A drive shaft 12 is journaled on the frame 1 adjacent one end thereof and any suitable means, such as a sprocket 13 and chain 14 can be provided for transmitting motion from this shaft to a sprocket 15 or the like on the shaft 5. A smaller sprocket 16 may be secured to the shaft 5 and motion transmitted therefrom through a chain 17 and a sprocket 18 to the shaft 5. The sprockets are so proportioned that, while the shafts 5 and 4 will rotate in the same direction simultaneously, shaft 4 will be rotated at a much higher speed than the shaft 5. Thus while all of the belts will cooperate to carry material longitudinally of the machine, alternate belts 10 will move at a greater speed than the belts 11 and thus set up a drag upon any materials laid transversely on the belts so that they will be brought to positions where they will extend longitudinally of the spaces between the belts. This is particularly true of fish which, if placed transversely of the belts will soon be swung around to extend longitudinally of the machine and lie within the spaces between the belts.

For the purpose of supporting the upper portions of the belts at points between the wheels 7 and 8, longitudinally channeled supporting strips 19 are arranged under and in contact with the respective belts as shown particularly in Figure 3. These supporting strips are of a width equal to or less than the diameters of the belts supported thereby so as to leave unobstructed openings 20 between the belts. Partition strips 21 can be arranged above the centers of the belts adjacent one end of the machine, these strips 21 extending under a feed chute 22 discharging downwardly onto the machine. These strips 21 cooperate to provide channels for receiving the fish or other materials to be separated and distributing the same transversely of the separator. The space beneath the belts can be divided into separate compartments by partitions 23, these compartments being disposed in a series extending longitudinally of the machine. Obviously, therefore, as the belts are all driven in one direction the fish or other materials supported thereby will be conveyed over one or more of these compartments. As the spaces between the belts gradually increase in width, fish or other materials of different grades will be delivered by gravity between the belts and dropped into those compartments designed to receive them. Thus the fish or the like can be quickly and accurately graded.

The belts 10 are preferably formed of short cylindrical pieces of hard rubber, wood, or vitreous material, these pieces being strung on an endless wire rope 24. The sections of the belt have been indicated at 25 in Figure 4. In practice the fish or other materials to be separated are directed on the strips 21 and into the spaces therebetween by the chutes 22. The materials will be dragged along the strips 21 and spread out into the various spaces provided between the strips. Those of the fish or the like which are left lying obliquely or transversely of the belts will soon be straightened out by the relative movement of the belts and ultimately these fish or the like will gravitate through the spaces between the belts into the compartments provided for them. In a machine of standard length the distance between two adjoining belts will vary from three-eights of an inch to five-eighths of an inch but it is to be understood that these distances can be varied to suit the conditions under which the machine is used and to properly grade the material being handled.

What is claimed is:

1. A separator including a plurality of endless belts arranged side by side, said belts diverging toward one end to provide spaces therebetween gradually increasing in width toward one end, each belt including an endless rope and a plurality of separate pieces strung upon the rope and arranged end to end.

2. A separator including a plurality of endless belts arranged side by side, said belts diverging toward one end to provide spaces therebetween gradually increasing in width toward one end, each belt including an endless rope and a plurality of separate pieces strung upon the rope and arranged end to end, and means for supporting the upper portions of the belts, said means leaving the openings between the belts unobstructed.

3. A separator including a plurality of endless belts arranged side by side, said belts diverging toward one end to provide spaces therebetween gradually increasing in width toward one end, each belt including an endless rope and a plurality of separate pieces strung upon the rope and arranged end to end, means for supporting the upper portions of the belts, said means leaving the openings between the belts unobstructed, and means for driving alternate belts at a higher speed than the remaining belts, all of the belts being movable in the same direction simultaneously.

In testimony that I claim the foregoing as my own, I have hereto affixed my signature.

ARTHUR R. ROGERS.